US011931706B2

(12) United States Patent
Letts

(10) Patent No.: US 11,931,706 B2
(45) Date of Patent: *Mar. 19, 2024

(54) FLUID MIXING APPARATUS AND METHODS FOR MIXING AND IMPROVING HOMOGENEITY OF FLUIDS

(71) Applicant: Letts Create, LLC, Vero Beach, FL (US)

(72) Inventor: Michael J. Letts, Vero Beach, FL (US)

(73) Assignee: Letts Create, LLC, Vero Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/531,646

(22) Filed: Nov. 19, 2021

(65) Prior Publication Data

US 2022/0203310 A1 Jun. 30, 2022

Related U.S. Application Data

(63) Continuation of application No. 15/961,870, filed on Apr. 24, 2018, now Pat. No. 11,179,686.

(Continued)

(51) Int. Cl.

| | |
|---|---|
| ***B01F 27/1143*** | (2022.01) |
| ***B01F 25/54*** | (2022.01) |

(Continued)

(52) U.S. Cl.

CPC .......... *B01F 27/1143* (2022.01); *B01F 25/54* (2022.01); *B01F 25/60* (2022.01); *B01F 27/9211* (2022.01); *B01F 33/5012* (2022.01); *B01F 35/4111* (2022.01); *F04D 3/00* (2013.01); *B01F 35/31* (2022.01); *B01F 35/3203* (2022.01);

(Continued)

(58) Field of Classification Search

None

See application file for complete search history.

(56) References Cited

U.S. PATENT DOCUMENTS 1,966,325 A * 7/1934 Welch ........................ F04D 3/02 415/72
2,239,337 A * 4/1941 Nye ..................... B67D 7/0205 222/413

(Continued)

FOREIGN PATENT DOCUMENTS

DE 372795 C * 4/1923

*Primary Examiner* — Jennifer A Leung

(74) *Attorney, Agent, or Firm* — Accel IP Law, PLLC; Ferdinand M. Romano

(57) ABSTRACT

Apparatus that mixes non-homogenous fluid. A threaded shaft within a housing circulates fluid within a container to effect mixing. In one embodiment, when placed in a container of fluid, the housing the fluid is recirculated through opposing ends of the housing. In an embodiment of a related method for mixing, a pump housing containing a screw journaled for rotation receives fluid within a container and conveys the fluid therethrough to circulate a fluid portion in the container along an exterior surface of the housing for mixing with another fluid portion to improve fluid homogeneity. After mixing, the portion of the fluid which first circulates through the housing may recirculate through the housing with said another portion of the fluid. The fluid may be continuously mixed and recirculated through the housing.

2 Claims, 4 Drawing Sheets

Related U.S. Application Data

(60) Provisional application No. 62/489,159, filed on Apr. 24, 2017.

(51) Int. Cl.

| | |
|---|---|
| ***B01F 25/60*** | (2022.01) |
| ***B01F 27/921*** | (2022.01) |
| ***B01F 33/501*** | (2022.01) |
| ***B01F 35/41*** | (2022.01) |
| ***F04D 3/00*** | (2006.01) |
| ***F04D 3/02*** | (2006.01) |
| *B01F 35/30* | (2022.01) |
| *B01F 35/31* | (2022.01) |
| *B01F 35/32* | (2022.01) |
| *B01F 101/36* | (2022.01) |

(52) U.S. Cl.

CPC ..... *B01F 35/3214* (2022.01); *B01F 2035/351* (2022.01); *B01F 2101/36* (2022.01); *B01F 2215/0481* (2013.01); *B01F 2215/0495* (2013.01); *F04D 3/02* (2013.01)

(56) References Cited

U.S. PATENT DOCUMENTS

| | | | | | |
|---|---|---|---|---|---|
| 4,538,922 | A * | 9/1985 | Johnson | B01F 27/1143 | 366/279 |
| 5,899,566 | A * | 5/1999 | Zingel | B01J 8/10 | 366/266 |
| 7,832,923 | B2 * | 11/2010 | Mott | B01F 27/88 | 366/244 |
| 11,179,686 | B2 * | 11/2021 | Letts | B01F 23/47 | |

* cited by examiner

FLUID MIXING APPARATUS AND METHODS FOR MIXING AND IMPROVING HOMOGENEITY OF FLUIDS

RELATED APPLICATION

This application claims priority to U.S. Provisional Patent Application Ser. No. 62/489,159, filed 24 Apr. 2017, which is incorporated herein by reference.

FIELD OF INVENTION

The invention relates to systems and processes for mixing fluids. Features of the invention are especially applicable to fluids containing suspended particles which settle out and require remixing prior to fluid use. Drum barrels and totes are exemplary of containers which often require initial mixing or remixing of contents in suspension. In one embodiment, the invention provides a process of circulating volumes of materials having nonuniform distributions between upper and lower portions of a container to increase homogeneity.

BACKGROUND AND SUMMARY OF THE INVENTION

Industrial materials, e.g., chemicals and adhesives, are commonly transported and stored in containers. These include drums having a capacity of 55 gallons (208 liters), tote containers ranging in size to over five hundred gallons (1,893 liters), Intermediate Bulk Containers (IBCs) and Tanks. Some of the material contents are combinations of liquids and solids, or they may be other forms of suspensions. After the suspended portions (e.g., particles) settle out, the contents often exhibit varied levels of viscosity throughout the container. It can be a difficult or time consuming task to create or restore homogeneity. This is especially true for commercial activities, adding undesired cost to operations. Further, given the spatial variation of the physical characteristics of constituents in the container, it can be difficult to initially blend the components to achieve a desired degree of homogeneity. This can be problematic, or at least inefficient, when the components are remixed, or the components are mixed together for the first time, in a remote location at which large, high powered mixing machinery is not available. The difficulty is frequently encountered because many industrial applications require that mixing of materials takes place at the location of an application. Construction job sites are exemplary of such locations.

With regard to drum containers, a conventional technique for mixing combinations of low and high density materials has employed one or multiple impellers which may be of the type which expand during rotational operation. The impellers are typically coupled to a shaft driven by an air motor. A feature of the present invention is based, in part, on recognition that prior art techniques for mixing viscous materials occur near in the plane of impeller rotation. Also, such mixing steps to improve homogeneity often do not occur without introduction and entrainment of air into the fluid being mixed. The term homogenization as used herein refers to mixing disparate components to render the mixture more uniform, and the term homogeneity refers to the degree of uniformity in distribution.

It has been recognized that when a homogenized fluid containing entrained air reacts (such as when insulative foam is generated by spray mixing the combination of a two part mixture such as diphenylmethane di-isocyanate (A part) with Polyall (referred to as B part): air introduced during the mixing process may adversely affect the quality or quantity of the resulting chemical product. For example, when insulative foam is generated by spraying the combination of isocyanate with the polyall under heat and pressure, completely mixed (very homogeneous) Polyall is needed to enhance completion of the chemical reaction; and entrained air may nonetheless limit the volume of foam product produced or may adversely affect the physical characteristics of the resulting spray foam.

Prior mixing designs that employ impellers tend to push heavier fluid residing near the bottom of a container toward an outside wall of the container and, to some degree, upward. This may work well with low viscosity liquids, but it is believed the mixing design may has provided mixtures which react to create suboptimal yields of product after the mixed fluid is reacted with another fluid to create, for example, the above-referenced expandable foam. It does not appear that the extent and implications of ineffective mixing have been fully assessed in terms of lost yield. Nor has there been a fully acceptable solution that reduces unnecessarily high material costs which may be attributable to potentially suboptimal mixing processes. Generally, mixing of components within transportable containers is believed to have resulted in reduced yield of, for example, low density spray foam insulation products, perhaps on the order of ten percent.

In some applications, suboptimal results are attributable to insertion of mixing impellers within drum containers through an opening of limited size, (e.g., referred to as a bung opening) which is a standard feature along the container lid or otherwise along the top of the container. While this arrangement may provide convenience, clearance limits due to the size of the bung opening, e.g., typically two inches (approx. five cm and typically a circular threaded opening less than 6 cm in diameter) as well as clearance limitations in the container design, preclude further increasing the impeller size. For example, the size of the impeller, as measured along the radial direction, must often be limited. The radial direction refers to a direction extending from the axis about which the impeller spins.

Summarily, mixing impellers based on designs which expand during operation do not appear to provide optimal mixing and, for highly viscous materials, can result in relatively incomplete mixing, especially along lower surfaces of containers. In some instances this is because the impeller cannot operate close enough to the bottom surface of a cylindrically shaped drum to blend material along the bottom surface with other portions of the mixture. This is now recognized as a particularly undesirable limitation when mixing a higher viscosity material. Also, perhaps due to the viscous nature of settled materials, impellers that contact these materials may not be able to develop large circulating flow paths that blend together separated components present in different regions of the container. Consequently, although some stirring may occur, some relatively heavy, incompletely mixed, high viscosity material can be left near the bottom surface of a container. Simply increasing the impeller speed to compensate for this ineffectiveness may entrain more air into portions of the mixture without improving homogeneity.

Mixers using larger diameter impellers for large drum containers, e.g., on the order of 55 gallons (220 liters) require that the top of the drum container be removed and require that a custom top be installed with the larger impeller. The drawbacks of using the larger impellers include the labor required to install and clean the impeller, increased off-gassing of the chemicals within the drum during the impeller installation, and the potential for contamination of the mixing constituents. Also, with larger impellers, the energy and torque requirements of the driving motors must increase to more effectively circulate high viscosity fluids. Driving mechanisms have been limited by available air supplies for air driven motors or available power for electric motors.

Generally, a need exists for a device that can fully blend viscous liquids to a more optimal homogeneity without requiring higher power requirements or higher labor costs, and without creating the potential for material contamination.

BRIEF DESCRIPTION OF THE INVENTION

According to one embodiment of the invention an apparatus is provided for mixing non-homogenous fluid comprising a liquid component within a container. A tubular housing has an exterior surface and first and second opposing end portions each suitable for passage of the fluid therethrough. The first end portion includes at least a first opening, for positioning in the container and for receiving the fluid into the housing. The second end portion includes at least a second opening for emitting the fluid within the container. A threaded shaft is positioned within the housing to act as a screw conveyor. The housing and the shaft form an assembly which, when the shaft initially rotates within the container, circulates a non-homogeneous component of the fluid within the container. When the assembly is immersed in the non-homogeneous fluid and the shaft undergoes rotation with respect to the housing, a portion of the non-homogeneous fluid enters the housing through the first opening, exits the housing through the second opening and travels along the housing exterior surface to effect circulation of the non-homogeneous fluid through the assembly. This effects mixing which improves homogeneity of the fluid. An embodiment of the apparatus further includes a drive mechanism comprising an air-driven motor coupled to the threaded shaft to effect rotation of the shaft at a variable number of revolutions per minute (RPMs) within the container. The housing may have an outside diameter suitable for insertion of the housing through a bung opening formed along an upper surface of the container, such as an opening in the container which is normally closed while the fluid in the container is being stored or transported.

A method is also provided for mixing non-homogeneous fluid. In one embodiment a pump having a housing containing a screw journaled for rotation therein, the housing having a tubular shape with first and second opposing end portions each suitable for passage of liquid therethrough, the first end portion including at least a first opening for receiving the fluid into the housing and the second end portion including at least a second opening for emitting the fluid. The pump is positioned in a container comprising the non-homogeneous fluid so that the first opening is totally immersed in the fluid. The screw is rotated relative to the housing to pump or otherwise convey the non-homogeneous fluid from the first opening, through the housing and out the second opening while retaining the fluid in the container such that a portion of the fluid in the container first circulates through the housing and along an exterior surface of the housing to mix with another portion of the fluid to improve homogeneity of the fluid. After mixing the portion of the fluid which first circulates through the housing may recirculate through the housing with said another portion of the fluid. If the container includes a resealable opening, the pump may be inserted through the container opening. The fluid may be recirculated with the pump prior to removal of fluid from the container. The container may be a drum container having a bung opening along a lid thereof through which the pump is inserted prior to rotating the screw to circulate the non-homogeneous fluid. Generally, the fluid may be continuously mixed and recirculated through the housing. Both the first and second openings in the housing may be totally immersed in the fluid. The housing and the screw may be totally immersed in the fluid.

A feature of embodiments of the invention is provision of an apparatus which effects mixing or homogenization of materials with different physical properties in a container used to store or transport the materials. Disclosed embodiments of the invention are suitable for portable use with such containers. In many applications the mixing process does not involve chemical reactions or operation at pressures different from atmospheric conditions and the apparatus can operate at ambient (e.g., room temperature) conditions, to be distinguished from reaction temperatures above room temperature or conditions where liquids of different temperatures must be mixed (e.g., to effect polymerization). Advantageously the apparatus and method may primarily operate by developing differential pressure which conveys fluid with a pumping action, to be distinguished from simply lifting material with a rotating screw according to an Archimedes principle. The design creates an upward axial flow to transfer material from a lower region of a container to an upper region of the container.

DESCRIPTION OF THE DRAWINGS

These and other features, and advantages of the present invention will become better understood when the following detailed description is read with reference to the accompanying drawings, wherein.

Like reference numbers are used throughout the figures to denote like components. Numerous components are illustrated schematically, it being understood that various details, connections and components of an apparent nature are not shown in order to emphasize features of the invention. Various features shown in the figures are not to drawn scale.

DETAILED DESCRIPTION OF THE INVENTION

Figure 1:
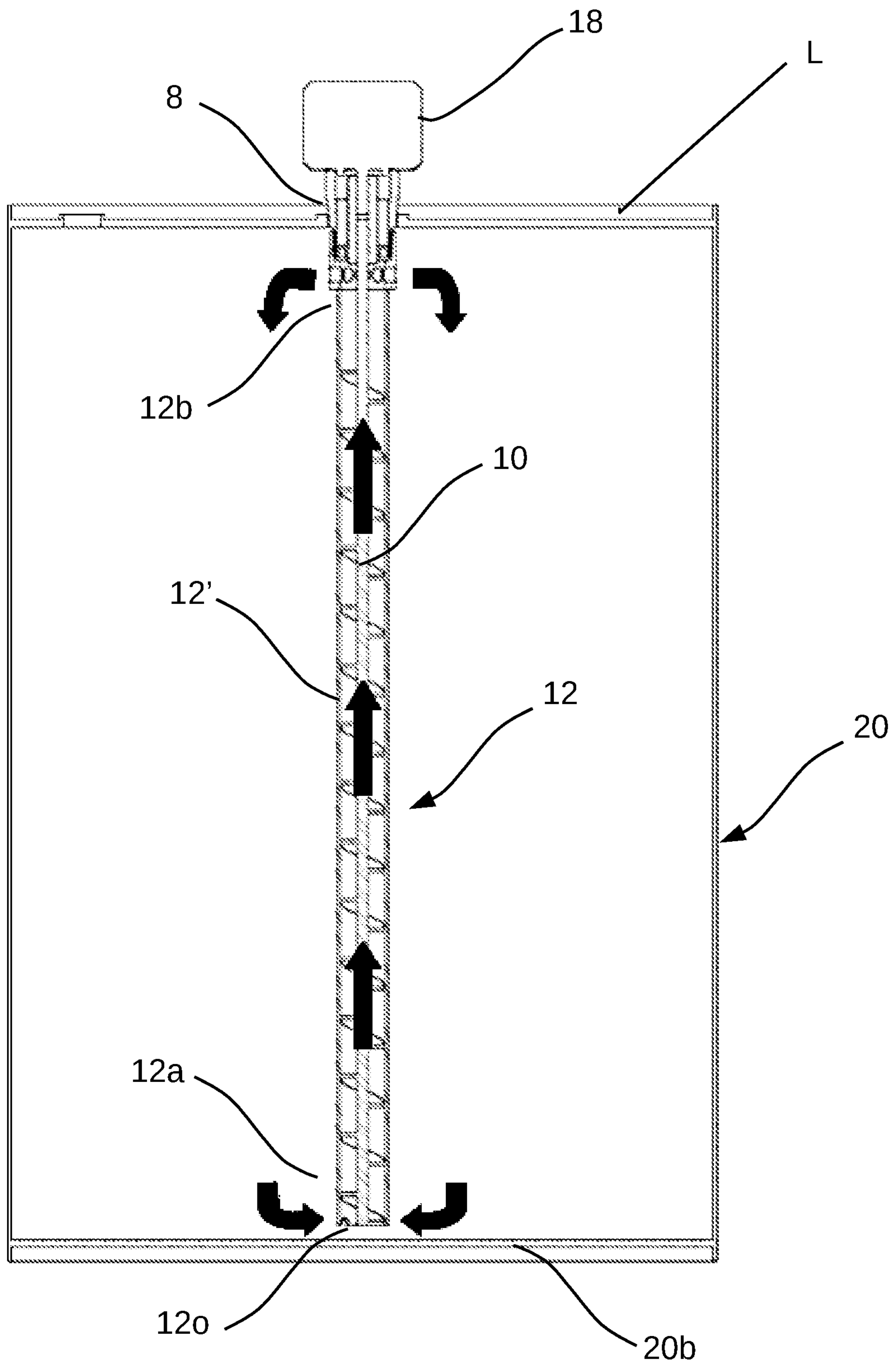
FIG. 1 is a partial cut-away elevation view of a portion of a fluid mixing apparatus according to an embodiment of the invention.

Referring to the figures generally, there is shown a fluid mixing apparatus 6, also referred to as a pump, according to an embodiment of the invention. The apparatus, shown installed through the lid, L, of a container, includes a pump subassembly comprising an auger screw 10, also referred to as a threaded shaft, positioned within a tubular, cylindrically shaped pump housing 12. More specifically, the apparatus is illustrated positioned for operation in a 55 gallon (220 liter) drum container 20, but the invention may be deployed in a wide variety of container sizes and designs, including totes and tanks, and is not limited containers having cylindrical shapes. As shown in FIG. 1, the apparatus is mounted through a standard two inch (5 cm) diameter bung opening 8 in the lid L. During transport and storage of the container the opening 8 is normally sealed with a threaded member The auger screw 10 and the housing 12 may be fabricated from a wide variety of materials, including Al, stainless steel, composites, molded plastics and carbon fiber compositions.

Figure 2A:
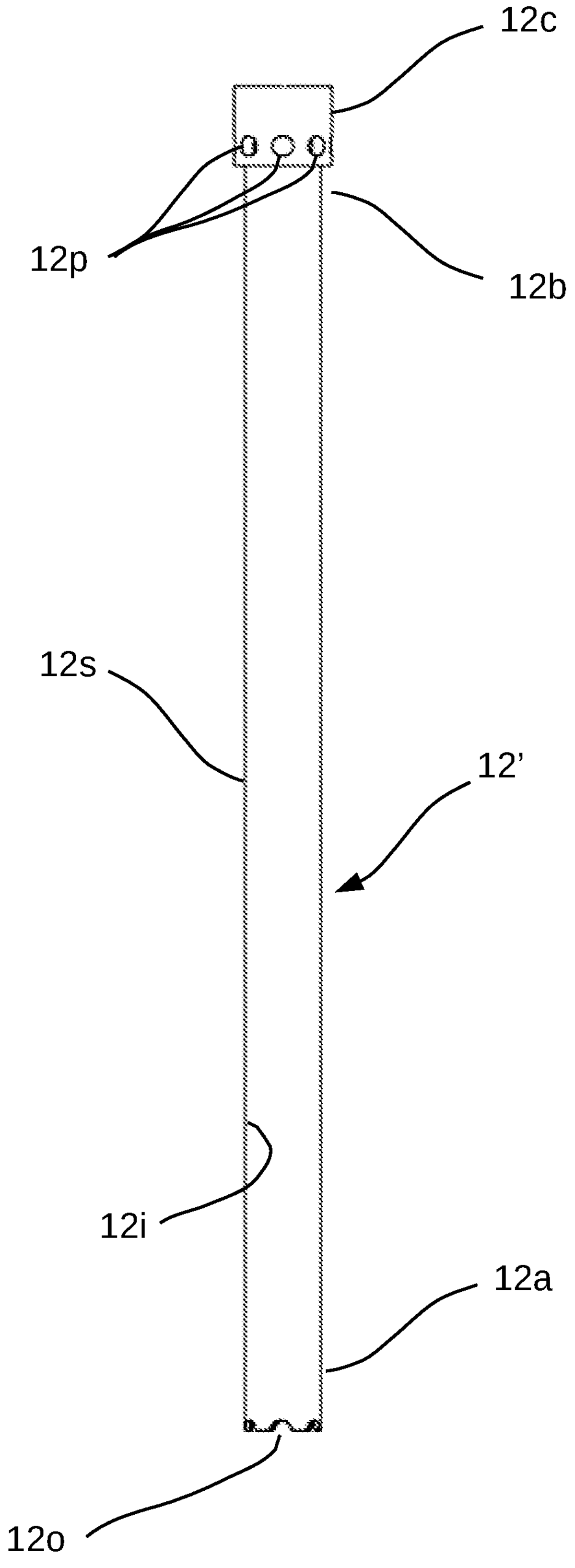
FIG. 2A illustrates the housing of a pump subassembly shown in the embodiment of FIG. 1.
Figure 2B:
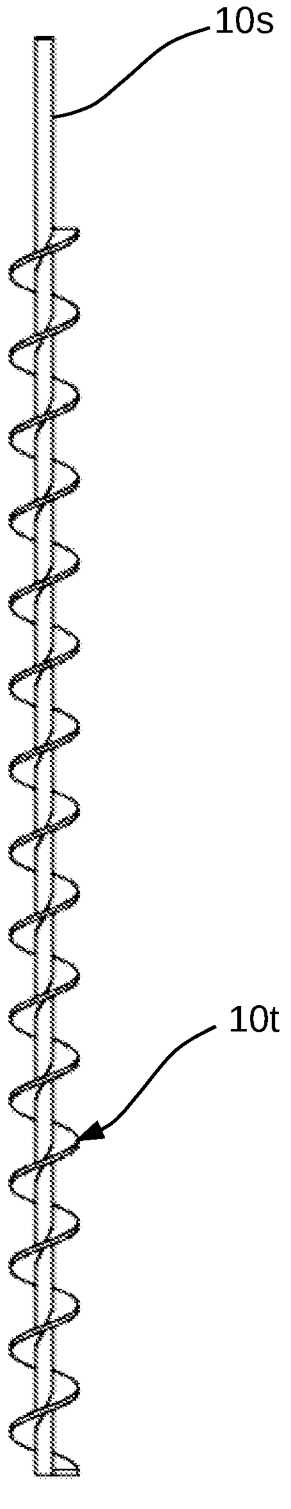
FIG. 2B illustrates the auger screw component of the pump subassembly shown in the embodiment of FIG. 1.
Figure 3:
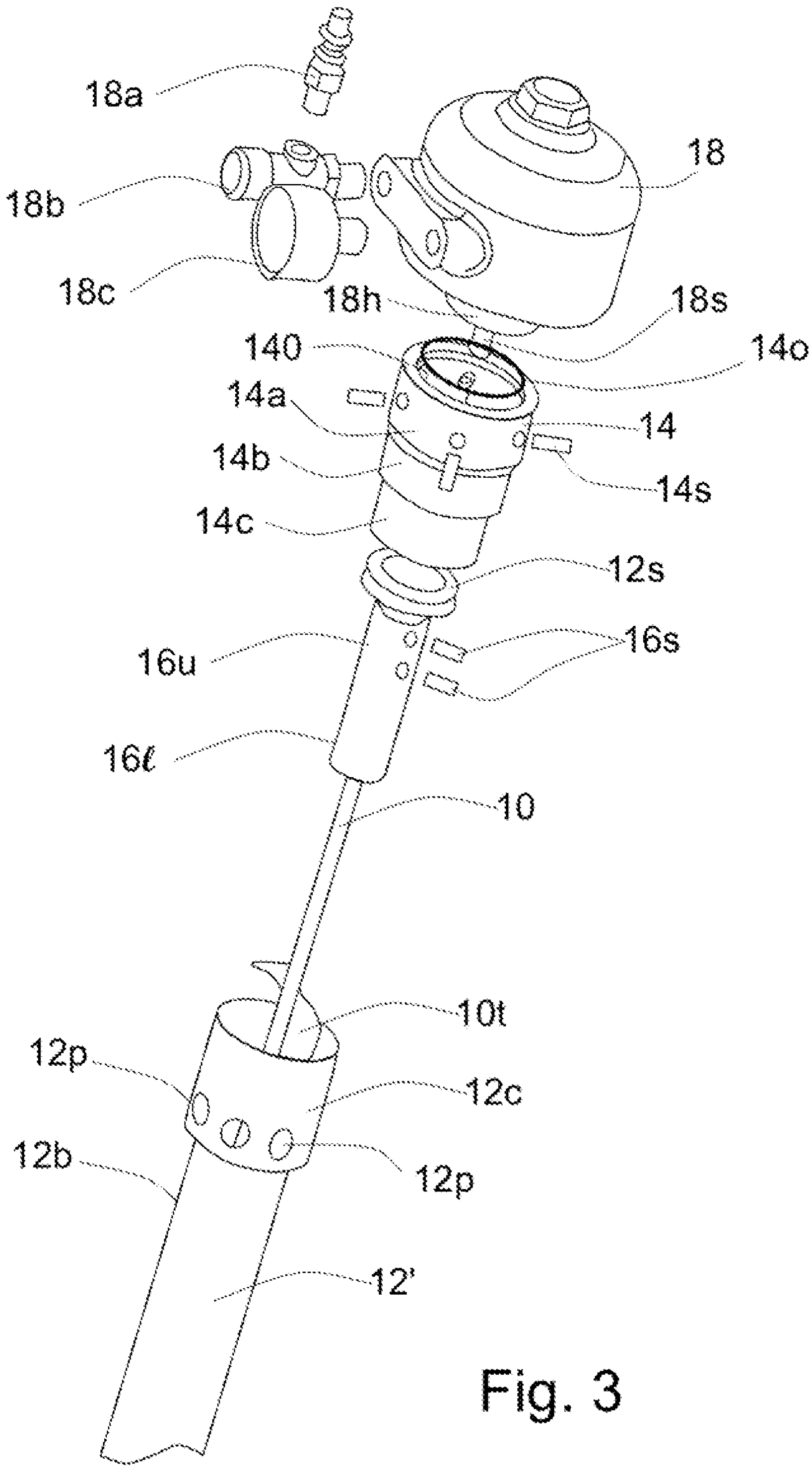
FIG. 3 is an exploded view of components in the fluid mixing apparatus shown in FIGS. 1 and 2.

The pump housing 12 includes a cylindrically shaped body 12' having lower and upper opposing end portions 12*a*, 12*b*, each suitable for passage of fluid therethrough, and a collar 12*c* positioned to extend from the upper end portion 12*b* and away from the cylindrically shaped body 12'. The lower end portion 12*a* includes one or more inlet openings 12*o* for receiving the fluid into the pump housing 12. Inlet openings 12*o* may be located at one or at multiple different positions along the lower end portion 12*a*. Distances from one or plural inlet openings to the bottom of the container may be determined based on the quantity and range of density or viscosity of fluid material along the bottom of the container. In the illustrated embodiment the lower end portion of the body 12' is open, providing the inlet opening 12*o*. The inlet opening may include a series of cutouts along the wall of the body 12' to facilitate fluid flow into the housing. See FIG. 2A.

The upper end portion 12*b* of the pump housing 12 terminates in a second opening (not illustrated) about a terminating edge (also not illustrated) having a circular shape and a flat surface perpendicular to the cylindrical axis of symmetry of the housing 12. The circular shape and flat surface of the terminating edge provide a suitable interior ledge for seating of a circular shaped seal 12*s* when a collar is fitted about the upper end portion. In the example design a collar 12*c*, having an inside diameter slightly larger than the outside diameter of the second end portion 12*b*, is placed about the upper end portion 12*b* so that the collar 12*c* extends beyond the upper end portion; and the terminating edge of the housing is positioned against an interior wall of the collar 12*c* to provide the interior ledge for seating of the seal 12*s*. The positioned collar 12*c* is welded in place to the housing upper end portion 12*b*.

The portion of the collar 12*c* extending away from the second end portion 12*b* of the housing 12' terminates in an opening 12*o*' having a diameter equal to the outside diameter of the cylindrically shaped body 12', e.g., about 1.75 inches (4.44 cm). The interior surface of the collar 12*c* adjacent the opening 12*o*' includes a series of threads (not illustrated) to securely affix the collar to an adapter by which the pump housing 12 is attached to the motor 18. The collar 12*c* further includes a series of circular exit ports 12*p* circumferentially distributed about the collar to provide passage of fluid, received through the inlet opening(s) 12*o* and conveyed through the cylindrically shaped body 12', out of the housing 12. The illustrated apparatus 6 includes eight such exit ports 12*p* arranged in a circular pattern around the collar, but this is exemplary. A variable number the ports may be arranged in a variety of configurations to effect mixing.

The auger screw 10 is generally in the shape of a cylindrical body with threads 10*t* formed therein providing the cylindrical profile. The majority of the length of the exemplary auger screw comprises one continuous thread but the thread does not extend along an upper shaft portion 10*s* of the auger screw 10. The threaded portion of the auger screw is positioned within the housing 12 with relatively small clearance between the thread pattern and the interior wall of the housing 12. With the cylindrically shaped body 12' having an inside diameter of 1.5 in. (3.81 cm), the clearance between the thread pattern on the auger screw and the interior surface of the body 12' may be 0.125 in. (3.175 mm) or less, e.g., less than or equal to 0.0625 in. (1.59 mm).

The upper shaft portion 10*s* of the auger screw 10 is engaged with the shaft 18*s* of a motor 18 to drive the pump subassembly. The upper shaft portion 10*s* of the auger screw is of sufficient length to allow a coupling 16 to be installed between the auger screw 10 and the shaft 18*s* of a motor 18 when the auger screw is inserted into the housing 12 from the lower end portion 12*a* of the cylindrically shaped body 12'. The illustrated motor 18 driving the auger is air-driven, but may be an electric or hydraulic motor. The air-driven motor includes an air chuck 18*a* coupled to a flow control valve 18*b* which feed an air supply to the motor. Air output from the motor passes through a muffler 18*c*.

The motor size and the auger thread design (e.g., length, diameter and thread pitch) will vary depending on the application (e.g., flowrate requirements, range of fluid viscosity within the container and desired differential pressure between fluid entering and exiting the pump assembly.

As shown in FIG. 1, the pump assembly 10, 12 is coupled via an adapter 14 and a coupler 16 to the air motor 18 which controllably drives rotation of the auger screw 10 at variable speeds, e.g., up to 3,000 RPM or higher. An adapter 14 secures the apparatus 6 to the container lid, L, and also provides a firm and stable connection between the housing of the motor 18 and the housing 12 of the pump assembly as the apparatus develops necessary torque to create high RPM needed to generate sufficient pressure differentials for pumping the relatively dense materials.

The coupler 16 is a cylindrical body having upper and lower ends 16*u*, 16*l* and a bore extending therethrough to insert and lock the upper shaft portion 10*s* of the auger screw 10 to the shaft 18*s* of the motor 18 for rotation with one another and transfer of torque. The upper shaft portion 10*s* of the auger screw is inserted within the coupler lower end 16*l* and welded in place. The coupler upper end 16*u* receives the shaft 18*s* of the motor 18. A series of set screws 16*s* pass through the coupler upper end 16*u* to secure the motor shaft 18*s* to the coupler so that the air motor shaft effects powered rotation of the auger screw with the motor 18.

The adapter 14 is a hollow body through which the coupler 16 passes when attaching the adapter to the motor 18. The adapter 14 attaches to a cylindrically shaped lower housing section 18*h* of the air motor 18 through which the motor drive shaft 18*s* extends. A sealing O-ring 14*o* is positioned at this interface. An upper-most body section 14*a* of the adapter 14 includes an opening 14*o* sized to fit about the lower housing section 18*h*. Set screws 14*s* mounted through the upper-most body section 14*a* secure the adapter to the motor. With this attachment the motor drive shaft 18*s* is positioned within the adapter 14 while coupled to the upper shaft portion 10*s* of the auger screw. The apparatus 6 is secured to the container 20 by attachment of a mid-body section 14*b* of the adapter 14, which is a first threaded section, of suitable diameter (e.g., 2 inches) and thread pitch, that engages mating threads formed within the lid along the bung opening 8. Mating threads of the mid body section 14*b* and the bung opening are not shown in the figures. A lower-most body section 14*c* of the adapter is a second threaded section, of suitable diameter (e.g., 2 inches) and pitch, that engages afore-described mating threads formed along the interior surface of the collar 12*c*, i.e., adjacent the opening 12*o*', to securely affix the collar to the adapter.

An embodiment of a method to assemble the drum blender begins with attaching the adapter 14 to the collar by engaging threads of the lower-most body adapter section 14*c* with mating threads along the interior surface of the collar 12*c*. Next, the auger screw 10 is inserted through the lower end portion 12*a* of the housing 12 with the upper shaft portion 10*s* and the attached coupling 16 extending beyond the collar 12*c* and beyond the opening 14*o* of the upper-most adapter body section 14*a*. With the seal 12*s* positioned about the coupling 16, the threads of the lower adapter body section 14*c* engage mating threads along the interior surface of the collar 12*c* to affix the adapter 14 to the collar 12*c*. The motor shaft 18*s* is then inserted within the coupler upper end 16*u* and the set screws 16*s* are tightened about the motor shaft to couple the motor shaft 18*s* with the upper shaft portion 10*s* of the auger screw. During installation of the apparatus 6 the cavity interior to the coupling 12*c* and adapter 14, bounded by the seal 12*c* and the lower motor housing section 18*h*, is filled with lubricating grease.

The motor 18 is then moved into mating contact with the adapter 14 and secured to the adapter. This displacement also moves the auger screw 10 into its operational position within the housing 12. Specifically, the lower housing section 18*h* of the motor 18 is positioned within the opening 14*o* of the upper-most adapter body section 14*a* and affixed to the housing section by tightening the set screws 14*s*. This secures the adapter 14 to the motor 18 with the motor drive shaft 18*s* positioned within the adapter 14. The apparatus 6 is then installed by inserting the housing 12 through the bung opening 8 and into the container 20, and then rotating the adapter to engage threads of the adapter mid body section 14*b* with the mating threads formed along the lid bung opening 8. The adapter is rotated to securely tighten the connection to the container for mixing of contents with the apparatus.

During operation, fluid within the illustrated drum container 20 is circulated and mixed along a path extending along an inner surface 12*i* of the housing 12, from the inlet opening(s) 12*o* to the exit ports 12*p*, and then along an outer surface 12*s* of the housing 12 where the fluid emitted from the exit ports mixes with other portions of the fluid in the container. The fluid which has exited the ports 12*p*, as part of a mixture of fluids from different regions in the container, may then re-enter the housing 12 through the first opening(s) 12*o*.

When the assembly 6 is immersed in a non-homogeneous fluid, there may be relatively dense material along the container bottom 20*b* (e.g., having viscosity on the order of 1,000 to 5,000 Centipoise (cps); and there may be relatively light material (e.g., having a lower viscosity on the order of one to 100 cps) in an upper region closer to the lid, L. With rotation of the auger screw 10 relative to the housing 12, a portion of the relatively dense or high viscosity fluid material enters the housing 12 through the inlet opening(s) 12*o*, travels through the housing 12 and, upon exiting through the ports 12*p* may begin to mix with the relatively light or low viscosity fluid material. Continued movement of high viscosity fluid and low viscosity fluid along this path effects further mixing of fluid components within the container, thereby increasing homogeneity of the fluid.

An exemplary flow path generated with operation of the apparatus 6 in a container filled with fluid is shown in FIG. 1. In one method of operation, initially, when the apparatus is started, the air motor 18 drives the pump (10, 12) at relatively low speeds, e.g., 100 to 500 RPM to begin slowly pulling the higher density fluid from along the bottom of the container for redistribution out of the exit ports 12*p* for a period of 5 to 10 minutes.

The pump speed may be retained in the range of 100 to 500 RPM to prevent the apparatus 6 from pulling lower viscosity fluid located above the inlet opening(s) 12*o* (e.g., closer to the container lid, L), and to prevent the pump from drawing air from above the surface of the fluid; so that the volume of material initially drawn into the housing primarily consists of material having viscosity values in the highest range present in the container.

As portions of fluid having different material compositions are combined, the rotational speed of the auger screw 10 may be increased over a period of, for example, five to thirty minutes, to improve homogenization without drawing air or creating cavitation. Generally, the auger screw 10 is rotated within the housing 12 to move fluid upward within the housing 12 from a lower portion of the container.

The threads of the auger screw 10 may be straight or tapered. The thread count or pitch of the auger screw 10 (e.g., threads per inch or spacing in mm) can be optimized for mixing based on the fluid components in the container that are to be blended. The auger shaft is slightly smaller than the housing to allow minimum clearance based on tolerances of the shaft 10 and the housing 12.

Definition of the invention is not limited to any particular theory of operation. The apparatus may function in two operating modes. At very low speeds operation of the auger screw 10 within the housing 12 may lift materials upward from near the container bottom 20*b*, i.e., involving little or no differential pressure between the inlet opening(s) 12*o* and the exit ports 12*p*. At higher rotational speeds, operation of the auger screw 10 within the housing 12 appears to develop a sufficient pressure differential between the inlet opening(s) 12*o* and the exit ports 12*p* to pump the fluid through the exit ports. As the fluid mixture becomes more homogeneous, generation of higher differential pressure values appears to improve the speed of achieving satisfactory fluid homogenization and the degree of fluid homogenization. Advantageously, at high speeds (e.g., 1,500-3,000 RPM) the pumped fluid may move axially through the housing 12 without significant turbulence.

It is believed, with operation of the apparatus based on axial rotation of a screw to generate differential pressure that conveys fluid material along the axis, foaming of high viscosity fluids is limited or absent. Further, the flow rate through the pump housing 12 may be less sensitive to changes in viscosity, possibly because the rotational screw design may be capable of sustaining a desired RPM despite varying demands for increased torque as the viscosity increases. It is believed that the effectiveness of the apparatus for generating the differential pressure at all speeds, to more optimally mix and homogenize fluids, is enhanced by minimization of clearance between the auger screw and the interior surface 12*i* of the housing 12.

One or more example embodiments of an apparatus and methods have been illustrated for mixing non-homogeneous fluids. The illustrated embodiments have been described to provide understanding of inventive concepts and underlying principles. It will be recognized by those skilled in the art that the concepts and principles of operation can be readily modified and extended to create other designs and methods providing enhanced performance and functionality to mixing and homogenization processes. Accordingly, the scope of the disclosure is only limited by the claims which follow with each claim describing an embodiment while still other embodiments may combine features recited in different claims. Combinations of different embodiments are within the scope of the claims and will be apparent to those of ordinary skill in the art after reviewing this disclosure.

The claimed invention is:

1. A portable pump assembly insertable through a first opening in a container to mix fluid in the container, the pump assembly comprising:

a screw mixing shaft which, when inserted and connected to the container, is rotatable with respect to the container, the pump assembly having first and second opposing end portions each suitable for passage of the fluid therethrough, the first end portion including a first pump-opening for receiving the fluid into the pump assembly and the second end portion including at least a second pump opening for emitting the fluid from the pump assembly to within the same container, wherein the mixing shaft positioned within the pump assembly to act as a screw conveyor, the pump assembly operable to circulate the fluid within the container while the mixing shaft is rotating wherein, when at least the first end portion of the pump assembly is inserted into a non-homogeneous portion of the fluid and the mixing shaft undergoes rotation with respect to the container, part of the non-homogeneous portion of the fluid enters the pump assembly through the first pump opening, exits the pump assembly through the second pump opening and travels along a surface of the pump assembly to effect mixing of fluid passing through the assembly, thereby improving homogeneity of the fluid;

a connection interface to provide engagement between a motor and the pump assembly to rotate the mixing shaft with the motor, the connection interface including a body section having a surface for connection to the pump assembly and providing a sealing engagement between the container and the pump assembly to seal the first opening in the container during mixing; and a collar fixedly positionable for connection about the second end portion of the pump assembly to extend away from the pump assembly, the collar having a surface along a collar opening sized and shaped to receive the surface of the body section for an engagement that affixes the body section to the pump assembly.

2. A method for mixing a liquid-containing non-homogeneous fluid in a container while an opening in the container is sealed, comprising:

removably inserting a pump assembly within the container to mix the liquid-containing non-homogeneous fluid in the container, the pump assembly including a screw mixing shaft rotatable with respect to the container, the pump assembly having first and second opposing end portions each suitable for passage of the fluid therethrough, the first end portion including at least a first opening for receiving the fluid into the pump assembly and the second end portion including at least a second opening for emitting the fluid from the pump assembly to within the same container, the mixing shaft positioned within the pump assembly to act as a screw conveyor, the pump assembly operable to circulate the fluid within the container while the mixing shaft is rotating, wherein, when at least the first end portion of the pump assembly is inserted into a non-homogeneous portion of the fluid and the mixing shaft undergoes rotation with respect to the container, the portion of the non-homogeneous fluid enters the pump assembly through the first opening, exits the pump assembly through the second opening to effect mixing of fluid circulating through the pump assembly thereby improving homogeneity of the fluid;

providing a connection interface to connect a motor to the pump assembly and an engagement to rotate the mixing shaft with the motor, the connection interface including a body section having a surface of predefined shape for connection to the pump assembly, the connection interface also providing a sealing engagement between the container and the pump assembly to seal the opening in the container during mixing; and providing a collar having a first end fixedly positionable for attachment to the second end portion of the pump assembly and a second end to extend away from the pump assembly, the collar second end having an opening along an interior surface with the opening sized and shaped to receive the surface of the body section for an engagement that affixes the body section to the pump assembly.

* * * * *